United States Patent [19]

Mecklenburg et al.

[11] 3,831,145

[45] Aug. 20, 1974

[54] MULTILEVEL DATA TRANSMISSION SYSTEMS

[75] Inventors: Paul Mecklenburg, Fort Lee; William King Pehlert, Jr., Holmdel; Daniel David Sullivan, Howell Township, all of N.J.

[73] Assignee: Bell Telephone Laboratories Incorporated, Murray Hill, N.J.

[22] Filed: July 20, 1973

[21] Appl. No.: 380,999

[52] U.S. Cl. .......... 340/146.1 R

[51] Int. Cl. .......... G06f 11/12, G08c 25/00

[58] Field of Search .......... 340/146.1 R, 146.1 AL, 340/347 DD; 325/38 A, 41, 42; 178/DIG. 3; 179/15.55 R

[56] References Cited

UNITED STATES PATENTS

| | | | |
|---|---|---|---|
| 3,601,702 | 8/1971 | Lender | 325/38 A |
| 3,613,077 | 10/1971 | Forney, Jr. | 340/146.1 R |
| 3,652,986 | 3/1972 | Monroe | 340/146.1 R |
| 3,656,108 | 4/1972 | Arbuckle et al. | 340/146.1 R |
| 3,754,237 | 8/1973 | de Laage de Meux | 340/347 DD |
| 3,798,544 | 2/1974 | Norman | 325/38 A |

*Primary Examiner*—Charles E. Atkinson

*Attorney, Agent, or Firm*—R. A. Ryan

[57] ABSTRACT

Improved forward acting error-control arrangements, including encoders and decoders, are described for use in $2^l$-level data transmission systems which employ Gray coding to transform a binary source sequence into the $2^l$-ary transmitted sequence. The codes called i-compressed codes make use of the structure of binary codes and have the property that for some integer $\underline{i}$, $1 \leq i \leq l$, transmission errors can be corrected if the erroneously received signals lie less than $2^{i-1}$ levels from the corresponding correct, or nominal, signal levels.

6 Claims, 19 Drawing Figures

FIG. 1A

| |
|---|
| 0 |
| 1 |

FIG. 1B

| | |
|---|---|
| 0 | 0 |
| 0 | 1 |
| 1 | 1 |
| 1 | 0 |

FIG. 1C

| | | |
|---|---|---|
| 0 | 0 | 0 |
| 0 | 0 | 1 |
| 0 | 1 | 1 |
| 0 | 1 | 0 |
| 1 | 1 | 0 |
| 1 | 1 | 1 |
| 1 | 0 | 1 |
| 1 | 0 | 0 |

FIG. 1D

| | | | |
|---|---|---|---|
| 0 | 0 | 0 | 0 |
| 0 | 0 | 0 | 1 |
| 0 | 0 | 1 | 1 |
| 0 | 0 | 1 | 0 |
| 0 | 1 | 1 | 0 |
| 0 | 1 | 1 | 1 |
| 0 | 1 | 0 | 1 |
| 0 | 1 | 0 | 0 |
| 1 | 1 | 0 | 0 |
| 1 | 1 | 0 | 1 |
| 1 | 1 | 1 | 1 |
| 1 | 1 | 1 | 0 |
| 1 | 0 | 1 | 0 |
| 1 | 0 | 1 | 1 |
| 1 | 0 | 0 | 1 |
| 1 | 0 | 0 | 0 |

FIG. 2A

| | | | |
|---|---|---|---|
| 0 | 0 | 0 | 0 |
| 0 | 0 | 0 | 1 |
| 0 | 0 | 1 | 1 |
| 0 | 0 | 1 | 0 |
| 0 | 1 | 1 | 0 |
| 0 | 1 | 1 | 1 |
| 0 | 1 | 0 | 1 |
| 0 | 1 | 0 | 0 |
| 1 | 1 | 0 | 0 |
| 1 | 1 | 0 | 1 |
| 1 | 1 | 1 | 1 |
| 1 | 1 | 1 | 0 |
| 1 | 0 | 1 | 0 |
| 1 | 0 | 1 | 1 |
| 1 | 0 | 0 | 1 |
| 1 | 0 | 0 | 0 |

FIG. 2B

| | | |
|---|---|---|
| 0 | 0 | 0 |
| 0 | 0 | 1 |
| 0 | 1 | 1 |
| 0 | 1 | 0 |
| 1 | 1 | 0 |
| 1 | 1 | 1 |
| 1 | 0 | 1 |
| 1 | 0 | 0 |
| 0 | 0 | 0 |
| 0 | 0 | 1 |
| 0 | 1 | 1 |
| 0 | 1 | 0 |
| 1 | 1 | 0 |
| 1 | 1 | 1 |
| 1 | 0 | 1 |
| 1 | 0 | 0 |

FIG. 2C

| | |
|---|---|
| 0 | 0 |
| 0 | 1 |
| 1 | 1 |
| 1 | 0 |
| 0 | 0 |
| 0 | 1 |
| 1 | 1 |
| 1 | 0 |
| 0 | 0 |
| 0 | 1 |
| 1 | 1 |
| 1 | 0 |
| 0 | 0 |
| 0 | 1 |
| 1 | 1 |
| 1 | 0 |

FIG. 2D

| |
|---|
| 0 |
| 1 |
| 0 |
| 1 |
| 0 |
| 1 |
| 0 |
| 1 |
| 0 |
| 1 |
| 0 |
| 1 |
| 0 |
| 1 |
| 0 |
| 1 |

FIG. 8
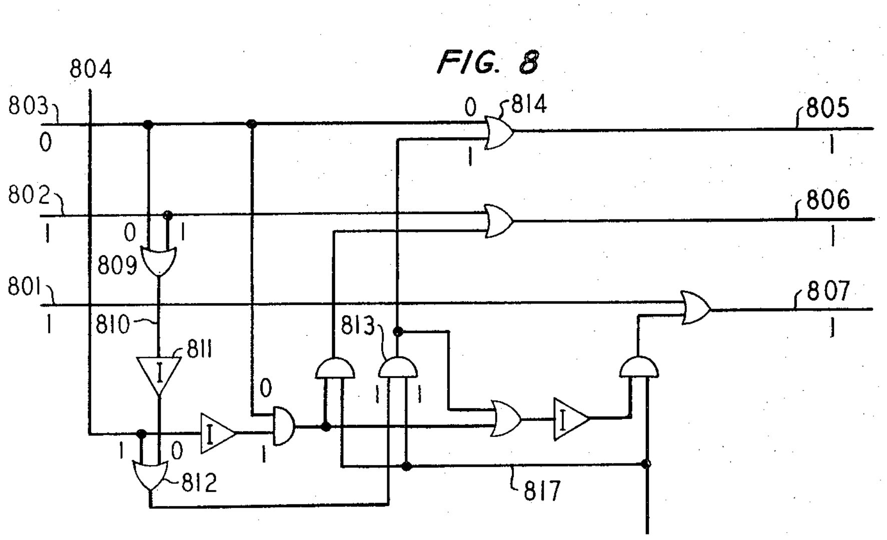
FIG. 9
| | | | | | | | |
|---|---|---|---|---|---|---|---|
| BINARY 3-TUPLE SEQUENCE | 101 | 001 | 110 | 000 | 111 | 001 | 100 |
| (14,6) UNDERLYING CODEWORD | 11 | 01 | 00 | 00 | 01 | 01 | 10 |
| | INFORMATION BITS | | | CHECK BITS | | | |
| TRANSMITTED 8-ARY SEQUENCE | 1 | 6 | 3 | 7 | 2 | 6 | 0 |
n = 14 ; k = 6 ; l = 3 ; i = 2
FIG. 10
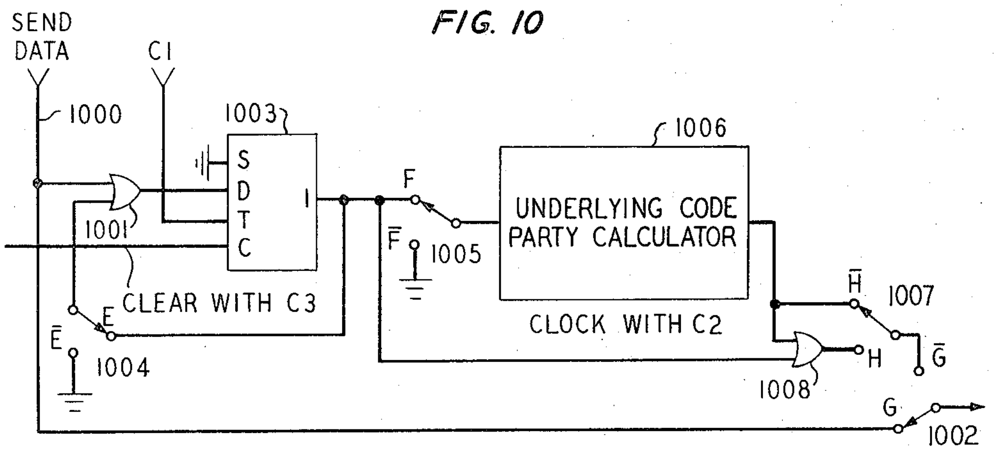

MULTILEVEL DATA TRANSMISSION SYSTEMS

BACKGROUND OF THE INVENTION

1. Field of Use

The present invention relates to data transmission systems and, more particularly, to multilevel or multiphase data transmission systems.

2. Prior Art

Conventional forward-acting error-control systems described, for example, in Error Correcting Codes by W. W. Peterson, M.I.T. Press and John Wiley and Sons, 1961, incorporate advantageous design parameters chosen to optimize performance while retaining efficiency. However, such optimization and efficiency are often gained at the expense of equipment complexity. Such systems typically operate at transmission rates low enough to permit the use of reasonably powerful error-correcting codes and to increase the percentage of error-free calls on a telephone network, for example.

The rate at which data can be transmitted in a multilevel or multiphase system is often limited by system parameters which make it impossible or impractical to signal faster. A straightforward solution to the problem would seem to be to increase the number of levels transmitted to achieve a higher bit rate. Experience has shown, however, that, on telephone channels, for example, nonlinear distortion, carrier phase jitter and impulse noise increase the error rate in multilevel systems when the number of transmitted levels is increased significantly.

It is therefore an object of the present invention to provide improved transmission of data signals in multilevel or multiphase transmission systems.

SUMMARY OF THE INVENTION

The present invention relates to $2^l$-level transmission systems and includes apparatus for generating a binary i-tuple signal corresponding to each l-tuple of binary source signals. An encoder encodes the resulting binary signals in the binary i-tuple sequence in accordance with an underlying conventional binary code $C(n,k)$ to produce binary check signals. Conventional circuitry partitions the concatenated source signals and check signals into l-tuples. Each l-tuple in turn, determines a Gray coded transmission level which is transmitted to a receiver.

Decoding circuitry at the receiver is arranged to generate a binary i-tuple signal corresponding to each received l-tuple Gray code word corresponding to the received transmission level. Errors in the binary i-tuple are indicated in accordance with the rules specified by the underlying code, C. The correct binary i-tuple together with a polarity-indicating signal generated in the decoder identify the correct Gray code l-tuple

BRIEF DESCRIPTION OF DRAWINGS

FIGS. 1A through 1D illustrate the generation of certain Gray code arrays from other Gray code arrays;

FIGS. 2A through 2D illustrate Gray code array properties useful in describing the present invention;

FIG. 8 shows a typical correction circuit suitable for use in the decoder of FIG. 7;

FIG. 9 shows a typical source bit sequence for encoding in accordance with an $i = 2$ compressed code;

FIG. 10 illustrates an $i = 2$ compressed code encoder;

DETAILED DESCRIPTION

1. Encoding

Figure 3:
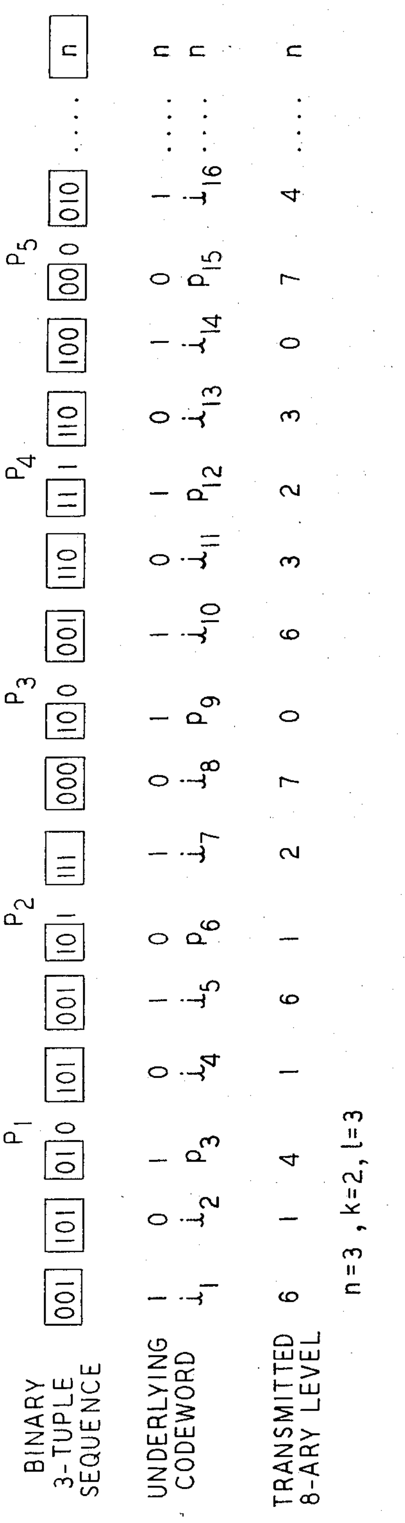
FIG. 3 shows a typical source bit sequence, the underlying code word and the transmitted l-ary symbols for an $i = 1$ compressed code.

The arrangements of the present invention are particularly useful in systems in which binary source data is transmitted over a $2^l$-level system in which the binary sequence is converted into the multilevel sequence by means of a Gray code. (Of course, the arrangements of the present invention are useful in multiphase systems, as well; however, for convenience, the terms "level" and "multilevel" will be used throughout and will be understood to include multiphase and other similar transmission modes).

In order to facilitate an understanding of the present invention, consider FIGS. 1A through 1D which illustrate a useful property of Gray code arrays. The degenerate two-level ($l = 1$) Gray code is shown in FIG. 1A. To obtain a four-level Gray code ($l = 2$) from the two-level code, it is initially necessary to reproduce the two-level Gray code just as it appears in FIG. 1A. Then the two-level code of FIG. 1A is rewritten below the recopied array such that the columns are aligned, leftmost column under leftmost column, and next-to-leftmost column under next-to-leftmost column but with the order of the rows reversed from top to bottom. Lastly, the array thus generated is modified by appending to it a column whose top half contains 0's and whose bottom half contains 1's. The appended column is positioned adjacent the leftmost column of the unmodified array. FIG. 1B illustrates the four-level array produced from the two-level array of FIG. 1A as described. By repeating this procedure on the four-level code array, an eight-level ($l = 3$) Gray code array, shown in FIG. 1C, is generated. One more step yields a sixteen-level ($l = 4$) code array, as shown in FIG. 1D.

Now consider FIG. 2A which is merely the sixteen level Gray code array of FIG. 1D, rewritten for clarity. In FIG. 2B, each row of the array of 3-tuples is obtained from the array of 4-tuples of FIG. 2A by adding together (mod 2) the ektries in the first two columns of each row, counting from left to right, and rewriting the last two entries in that row. The word "addition" where not explicitly stated otherwise is intended to mean mod 2 addition. The array of FIG. 2C is obtained by adding together the entries in the first three columns of each row of the array of FIG. 2A or, equivalently, the entries in the the first two columns of each row of FIG. 2B, and repeating the last column entry in that row. Finally, the array of FIG. 2D is obtained by adding together all of the entries in the columns of FIG. 2A or, equivalently, the two columns of FIG. 2C. The important observation to be made about these arrays is that the array of FIG. 2B consists of two eight-level Gray code arrays while that of FIG. 2C consists of four four-level arrays and that of FIG. 2D consists of eight two-level arrays. That such a result is obtained starting with any Gray code constructed as in FIGS. 1A through 1D can be easily verified by noting that ordering of rows in such an array is inverted by adding (mod 2) a column of 1's to the left-hand column. Hence, if we obtain an array of $(l-1)$ -tuples from a $2^l$-level Gray code array by adding the leftmost column to the next adjacent column, both the upper and lower halves of the resulting array are $2^{l-1}$-level Gray codes in the original order. By repeating this procedure with the new array, we then obtain repetitions of lower-level Gray code arrays. These heuristic observations are formally restated in the following lemma.

Lemma: the array of $2^l$ i-tuples obtained by adding together the first $l-i+1$ columns (counting from the left) of a $2^l$-level Gray code array (ordered as described herein) and repeating the remaining $i-1$ columns consists of $2^{l-i}$ repetitions of a $2^i$-level Gray code.

This lemma will subsequently be seen to be the key to the advantageous error-correcting properties of the codes and arrangements which we now described.

Consider a $2^{\Omega}$ -level transmission system and let $i$ be an integer such that $1 \leq i \leq l$. Let C be a binary (n,k) code which will be called the underlying code and which is capable of correcting at least (a) $2^{i-1}$ random errors or (b) a single error burst of length $2^{i-1}$ or less. Assume further that $n$ and $k$ are both divisible by $i$. The particular manner in which the underlying code is involved in the encoding procedures will become clear from the following discussion. Encoding for error protection in accordance with the present invention is accomplished as follows:

1. Enter $(k/i)-)$ source bits into the encoder. These bits are partitioned into $k/i$ l-tuples and each l-tuple determines a Gray coded $2^l$-ary symbol which is transmitted over the channel.
2. Derive a binary i-tuple from each of the $k/i$ l-tuples as follows:
   a. The first bit of the i-tuple is the mod 2 sum of the leftmost $l-i+1$ bits of the l-tuple;
   b. The rightmost $i-1$ bits of the $i$-tuple agree with the rightmost $i-1$ bits of the l-tuple.
3. Concatenate the resulting $k/i$ binary $i$-tuples to produce a binary $k$-tuple which is interpreted as the "information" portion of a code word in the underlying code C. Using conventional binary encoding techniques, compute a binary $(n-k)$-tuple corresponding to the "parity" portion of the code word as specified by the rules realting to the code C. Now partition this $(n-k)$-tuple into $(n-k)/i$ $i$-tuples.
4. Combine each $(n-k)/i$ $i$-tuple with $l-i$ additional source information bits to obtain an additional l-tuple (hence, an additional transmitted $2^l$-ary symbol) as follows:
   a. The first $l-i$ bits of the l-tuple agree with the $l-i$ information bits;
   b. The $(l-i+1)$th bit of the l-tuple is the mod 2 sum of the $l-i$ information bits and the first bit in the i-tuple;
   c. The remaining $-1$ bits in the l-tuple agree with the remaining $i-1$ bits in the i-tuple The above encoding procedure, so-called i-compressed coding, results in a tansmitted sequence of $n/i$ $2^l$-ary symbols, or an i-compressed code word, having the property that if the operations specified by steps 2a and 2b above are performed on the binary l-tuple signals associated with these symbols, the resulting sequence of $n$ binary digits is a valid code word in C. Of the $n\cdot l/i$ binary digits corresponding to the transmitted sequence, all but $n-k$ are source information bits, hence the rate R of the resulting code is $$R=\frac{\frac{l}{i}\cdot n-(n-k)}{\frac{l}{i}\cdot n}=1-\frac{i}{l}(1-R_C)$$

where $R_C=k/n$ is the rate of the underlying code.

When $i=1$, the codes are single-level error-correcting codes whereas when $i=l$ the codes are conventional binary codes.

It is considered that an example will best illustrate the principles of operation of the present invention. Consider, then, an eight-level transmission system for transmitting binary data in accordance with an $i=1$ compression code. For such an arrangement, $2^l=8$, $l=3$ and $i$ therefore satisfies the criterion $1 \leq i \leq l$. The underlying code, C in this instance, is chosen to be a convolutional Hamming-type code for which $n=3$ and $k=2$. The encoder in such an arrangement encodes the signals according to the procedure specified above. Before discussing the encoder circuit of the preferred embodiment of the present suggestion, it is considered appropriate to first consider the signals developed in that embodiment step by step for the instant code. Thus, as detailed above, 1. $(k/i)\cdot l$, or 6, source bits are entered into the encoder. These source bits are partitioned into two 3-tuples and each 3-tuple determines a Gray coded 8-ary symbol which is then transmitted over the channel.
2. Simultaneously, each of the two 3-tuples is used to derive a binary 1-tuple as follows:
   a. The mod 2 sum of the first $(l-i+1)=3-1+1=3$ bits of the 3-tuple reading from left to right is computed. This sum forms the 1-tuple. FIG. 3 illutrates a typical encoded sequence of binary bits (binary 3-tuples) in which the binary source bits have been enclosed in boxes for emphasis. The mode 2 sum of the first 3-tuple is 1. This bit is designated $i_1$ and the designation is written directly below the first 3-tuple for clarity. Similarly, the mod 2 sum of the second 3-tuple, designated $i_2$, is O as illustrated in FIG. 3 directly below the second 3-tuple;
   b. The procedure specified above provides that the last $i-1$ bits of the i-tuple agree with the last $i-1$ bits of the l-tuple. In this instance $i=1$ and $l=3$, as is clear; hence, there are no contributions to the i-tuple corresponding to the last $i-1$ bits.

The two binary 1-tuples resulting from the mod 2 addition of the three bits in each of the first two 3-tuples are considered information bits in the underlying code C.

At this point, it proves convenient to more particularly specify the underlying code chosen for the example under consideration. The underlying code for this example is a convolutional code of the form, $i_1\, i_2\, p_3\, i_4\, i_5\, p_6\, i_7\, i_8\, p_9\, i_{10}\, i_{11}\, p_{12}\, i_{13}\, i_{14}\, p_{15} \ldots$, where the symbol $i$ designates data bits and the symbol $p$, designates parity bits. In addition, the parity bits are generated from the information bits as follows:

$$p_3 = i_1 \oplus i_2,$$

$$p_6 = {}_1 \oplus i_4 \oplus i_5$$

and $$p_n = i_{n-7} \oplus i_{n-5} \oplus i_{n-2} \oplus i_{n-1}$$

where $n = 9, 12, 15, 18, \ldots$, and where the symbol $\oplus$ signifies, of course, mod 2 addition.

Proceeding, then, $p_3$ is generated by forming the mod 2 sum of $i_1$ and $i_2$. The $p_3$ shown in FIG. 3 is a binary 1.

3. The l-tuple check signal, $p_3$, is then combined with $3 - 1 = 2$ additional source bits to obtain an additonal 3-tuple and hence an additional transmitted 8-ary symbol as follows:
   a. The first two bits of the 3-tuple agree with the two source bits (the 2-tuple enclosed in a box immediately succedding the two boxed 3-tuples in FIG. 3);
   b. The $(3 - i + l)$th bit, that is, the third bit of the 3-tuple, is the mod 2 sum of the two information bits of the 2-tuple and the parity bit, $p_3$ in this case, that is, O. This last bit, labeled $p_1$ in FIG. 3, completes a 3-tuple.

Similarly, consider the next two 3-tuples of source bits—namely, 101 and 001 boxed as shown in FIG. 3. Again, the mod 2 sum of the first 3-tuple is calculated and the result, $i_4$, indicated on FIG. 3 directly below the first 3-tuple. In the same manner, the mod 2 sum of the bits in the second 3-tuple are indicated below that 3-tuple as $i_5$. The next check bit, $p_6$, is then formed by computing the mod 2 sum of the data bits $i_1$, $i_4$ and $i_5$ as detailed above; $P_6$ is O. The next two source bits, 10, are then added, mod 2 to $p_6$ to complete the 3-tuple.

It will also be noted from FIG. 3 that the 8-ary symbol for each of the 3-tuples of the binary 3-tuple sequence is included.

Figure 6:
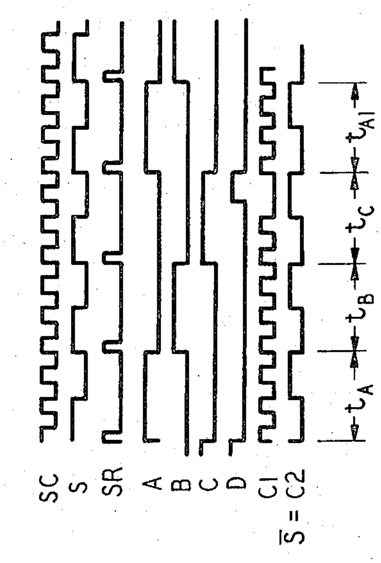
FIG. 6 illustrates the clock waveforms for controlling the circuit of FIG. 5.
Figure 5:
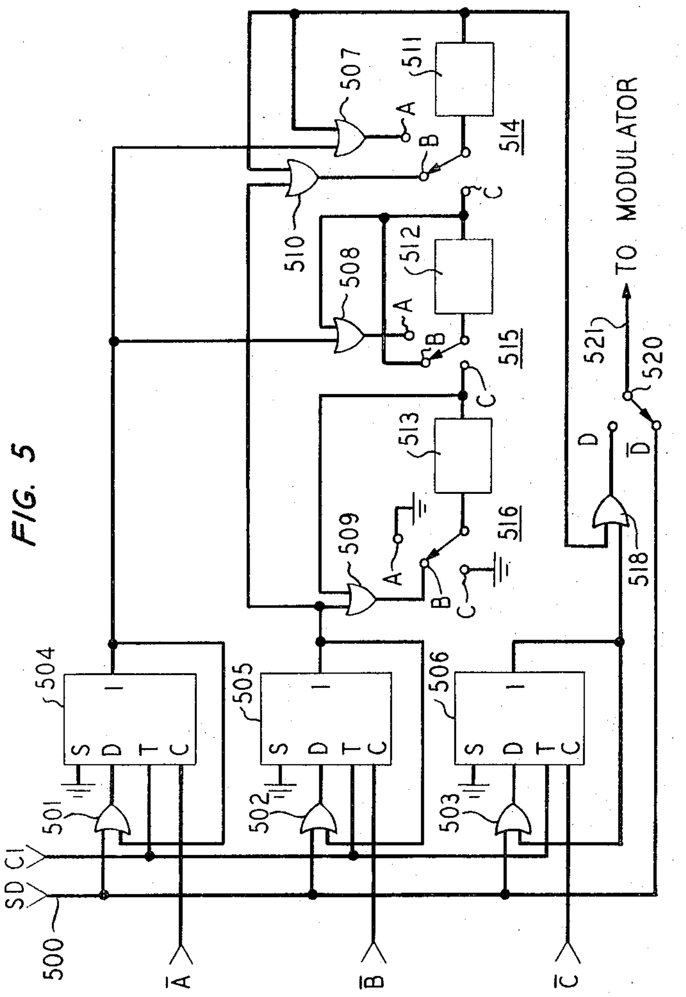
FIG. 5 illustrates an encoder in accordance with the principles of the present invention for encoding the source bit sequence of FIG. 3.

Consider now, the circuit of FIG. 5 which is arranged to encode the source sequence (the boxed bits of the binary 3-tuple sequence) of FIG. 3 in accordance with the principles of the present invention as described above. To simplify the explanation of the operation of the circuit of FIG. 5, the clock waveforms for controlling the circuit are shown in FIG. 6. In particular, attention is directed to the waveform designated C1 in FIG. 6. This is the source clock waveform for controlling the application of source bits to the input lead 500 of FIG. 5. Also shown on FIG. 6 is the waveform SC which is essentially the same as the waveform C1. The difference between the waveforms SC and C1 and the reason for the difference will become apparent from the following discussion. It is also apparent from FIG. 6 that the waveform A includes a positive-going pulse extending over the interval $t_A$, the waveform B includes a positive-going pulse extending over the interval $t_B$ and the waveform C includes a positive-going pulse extending over the interval $t_C$.

Initially, all the signal-storing elements of FIG. 5, namely, registers 504, 505 and 506 and single-stage shift registers 511, 512 and 513 are all cleared of entries. Registers 504–506 and the other registers discussed herein having inputs designated "SDT" and "C" are standard type D flip-flops. The first three source bits of the source sequence of FIG. 3, 001 in this case, are entered into the encoder of FIG. 5 via the lead 500 during the interval $t_A$ shown in FIG. 6. (It will be recalled that the bits in the sequences in FIG. 3 are read from left to right.) The input lead 500, in turn, is connected to each of the three mod 2 adders, 501, 502 and 503. The output signals from the mod 2 adders 501, 502 and 503 are applied to the D input of each of the registers 504, 505 or 506, respectively. Since each of the registers is initially clear, there is no signal applied to the mod 2 adders 501–503 via the feedback connection from the output of the registers 504–506 to respective inputs of mod 2 adders 501–503 during the application of th first source bit. Hence, the first first source bit. Hence, the first source bit is applied to the D input of each of the registers directly. At the same time, however, the control signals, $\bar{A}$, $\bar{B}$ and $\bar{C}$, the inverse of the signals characterized by the waveforms A, B and C of FIG. 6, are applied to the clear inputs C of the registers 504–506. Hence, it is apparent that the only one of the registers 504–506 which is not cleared during the interval $t_A$ is 504. Consequently, the first bit of the source sequence is entered into the register 504 only. During the application of the second source bit, also within interval $t_A$, the first source bit is reapplied to adder 501, where it is added (mod 2) to the second source bit. The sum is entered into register 504. Registers 505 and 506 continue to receive a clear signal. Similarly, during the application of the third source bit, each of the registers 505 and 506 is again cleared. Consequently, the third bit is added to the contents of register 504 which represents the sum of the first two bits. The output signal from register 504 at the end of interval $t_A$ is, then, $i_1$, shown in FIG. 3 and discussed above.

The output signals from register 504 in FIG. 5 are applied to mod 2 adders 507 and 508 together with the signals stored in single-stage shift registers 511 and 512, respectively. Switches 514 and 515 are in the A position during the interval $t_A$ and since these registers were cleared before the source bits were applied, the output from the mod 2 adders is the same as the output signals from the registers 504–506. At the end of interval $t_A$, then, $i_1$, is entered into registers 511 and 512.

During interval $t_B$, only register 505 is not cleared; hence, the next three source bits are added by means of mod 2 adder 502 and the feedback connection for register 505 and the sum, $i_2$, stored in register 505. The switches 514–516 are in the B position during interval $t_B$. Consequently, $i_2$ is applied directly to shift register 513. In addition, $i_1$ is reapplied to shift register 512 via the feedback connection associated with that register and switch 515. Lastly, the contents of shift register 511, $i_1$, are added (mod 2) to the output of register 505, $i_2$, by mod 2 adder 510. The resulting sum, $p_3$, is applied to register 511. (See the discussion above relating to FIG. 3.)

During interval $t_C$ the control signal C1, applied to the toggle input T of each of the registers 504–506, toggles the registers only twice rather than three times as during the intervals $t_A$ and $t_B$. As a result, only the next two source signals are applied to the registers 504–506. Noting from FIG. 6 that only register 506 is not cleared during the interval $t_C$, it becomes apparent that register 506 and mod 2 adder 503 generate and store the mod 2 sum of those two source bits. In addition, the switches 514–516 are in the C position. As a result, the contents of register 513, $i_2$, are shifted into register 512. Simultaneously, the contents of register 512, $i_1$, are shifted into register 511. Lastly, the contents of register 511, $p_3$, are applied to mod 2 adder 518 together with the output of register 506, the sum of the two source bits. The result of the summing operation by mod 2 adder 518 during the $t_C$ interval is $P_1$, the check bit in FIG. 3.

The waveform D in FIG. 6 relates to the operation of switch 520. Specifically, switch 520 is in the position $\overline{D}$ during the application of the first eight bits of the source sequence (the first two 3-tuples and the next two bits.) The switch 520 is then switched to the D position to admit the check bit to the binary 3-tuple sequence. The switch is again switched to position $\overline{D}$ for the next eight source bits.

To complete the analysis, consider the next three intervals controlled by signals corresponding to the intervals $t_A$, $t_B$ and $t_C$, of FIG. 6, calling the next three intervals $t_{A_1}$, $t_{B_1}$ and $t_{C_1}$, for convenience, During $t_{A_1}$, $i_4$, the sum of the 3-tuple, 101 in FIG. 3, is formed and stored in register 504. Similarly, during interval $t_{B_1}$, the sum, $i_5$, of the next 3-tuple, 001, is formed and stored in register 505 and during the interval $t_{C_1}$, the sum of the next two bits is formed and stored in register 506. $i_4$ is added to the contents of register 511, $i_1$, via adder 507 and switch 514. At the same time the contents of register 512, $i_2$, are reapplied to it via switch 515. During interval $t_{B_1}$, $i_5$ is entered into register 513, and added to the contents of register 511, $i_1 \oplus i_4$, to produce $i_1 \oplus i_4 \oplus i_5$, which is recognized to be $p_6$ in FIG. 3. Lastly, during interval $t_{C_1}$, $p_6$ is added by means of mod 2 adder 518 to the sum of the two source signals stored in register 506, to produce $P_2$. $P_2$ is interspersed with the binary source sequence signals via switch 520 as described above.

Each of the 3-tuples is then applied via lead 521 to a modulator where it is converted into an 8-ary level for transmission over a channel.

2. Decoding

Decoding in accordance with the principles of the present invention is accomplished as follows:

1. Generate a binary i-tuple from a received $2^l$-ary signal as follows:
   a. Generate signals representing the binary Gray code l-tuple corresponding to the received $2^l$-ary signal,
   b. Generate a signal corresponding to the mod 2 sum of the first $l - i + 1$ bits of the l-tuple thus generated,
   c. Form an i-tuple of signals by concatenating the signals corresponding to the mod 2 sum produced during step 1*b* above (the first bit of the i-tuple) and the last $-1$ bits of the l-tuple (the last $i - 1$ bits of the *-tuple*).
2. Form an n-tuple by concatenating $n/i$ consecutive i-tuples resulting from steps 1*a* through 1*c* above. Using the check signals in the underlying code, correct errors in the n-tuple and partition the n-tuple into $n/i$ corrected i-tuples.
3. For each of the corrected i-tuples, determine which of the $2^l$-ary symbols corresponding to the corrected i-tuple is nearest the actual received $2^l$-ary symbol. If the two are the same, the received $2^l$-ary symbol is considered to be in error. Consequently, the $2^l$-ary signal corresponding to the corrected i-tuple (nearest the received incorrect $2^l$-ary symbol) is chosen. The Gray codes corresponding to the i-tuple, then, reproduce the correct source signals.

Figure 4:
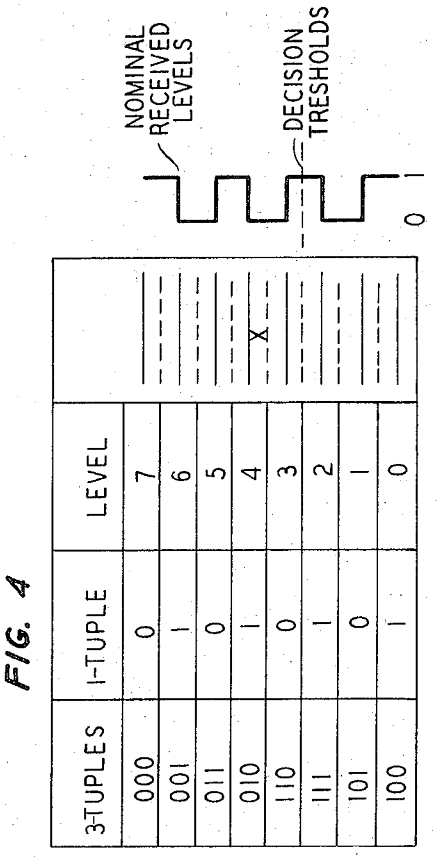
FIG. 4 shows the relationship between the 3-tuples, 1-tuples and 8-ary symbols for the encoded sequence of FIG. 3.

To illustrate, consider the 8-level system specified by the codes and decision thresholds of FIG. 4. Briefly, each 8-ary symbol in FIG. 4 is matched with the corresponding Gray code 3-tuple and corresponding 1-tuple derived from the 3-tuple as described above. In addition, the nominal level of the received signal for each 8-ary symbol as well as the corresponding decision thresholds are also illustrated. In order to clarify the operation of decoders constructed in accordance with the present invention, the correction of an error in a received level will be traced. Thus, note the position of the X in FIG. 4. Specifically, it is located between the solid line denoting the nominal level 4 signal and the dashed line denoting the lower decision threshold signal for the level 4 signal. Clearly, then, the decision circuitry in the receiver signals a received level 4. Assume, however, that the received signal is in error and that the signal transmitted was a level 3 signal. The 1-tuple generated in the receiver in response to the incorrect level 4 is 1 rather than 0 for the correct level 3.

Assuming that the underlying code, in this instance, has been chosen to permit the correction of two errors, the incorrect 1-tuple is changed from 1 to 0. The corrected 1-tuple, however, corresponds, clearly, to both the level 3 and the level 5. This ambiguity is resolved by providing apparatus in the receiver for signifying whether the incorrect l-ary level received from the channel was less than or greater than the nominal received level. It is common practice to include polarity specifying circuitry in multilevel systems to enhance the decision-making process. One such arrangement is described, for example, in *Principles of Data Communications* by R. W. Lucky et al., McGraw-Hill, 1968, p.44 et seq. In this case, the received level was less than the nominal level indicating that the correct level is less than the received level. The level 3 satisfies this criterion, whereas the level 5 does not. All that remains is to produce the binary 3-tuple corresponding to the correct level 3 to retrieve the desired source signals.

It is evident from the foregoing discussion and FIGS. 2A through 2D that in an i-compression encoder, errors in received levels can be corrected only if all received signal levels are less than $2^{i-1}$ levels from the correct nominal levels and the errors in the n-tuple derived from the received levels are within the error-correcting capability of the underlying code, C.

Figure 7:
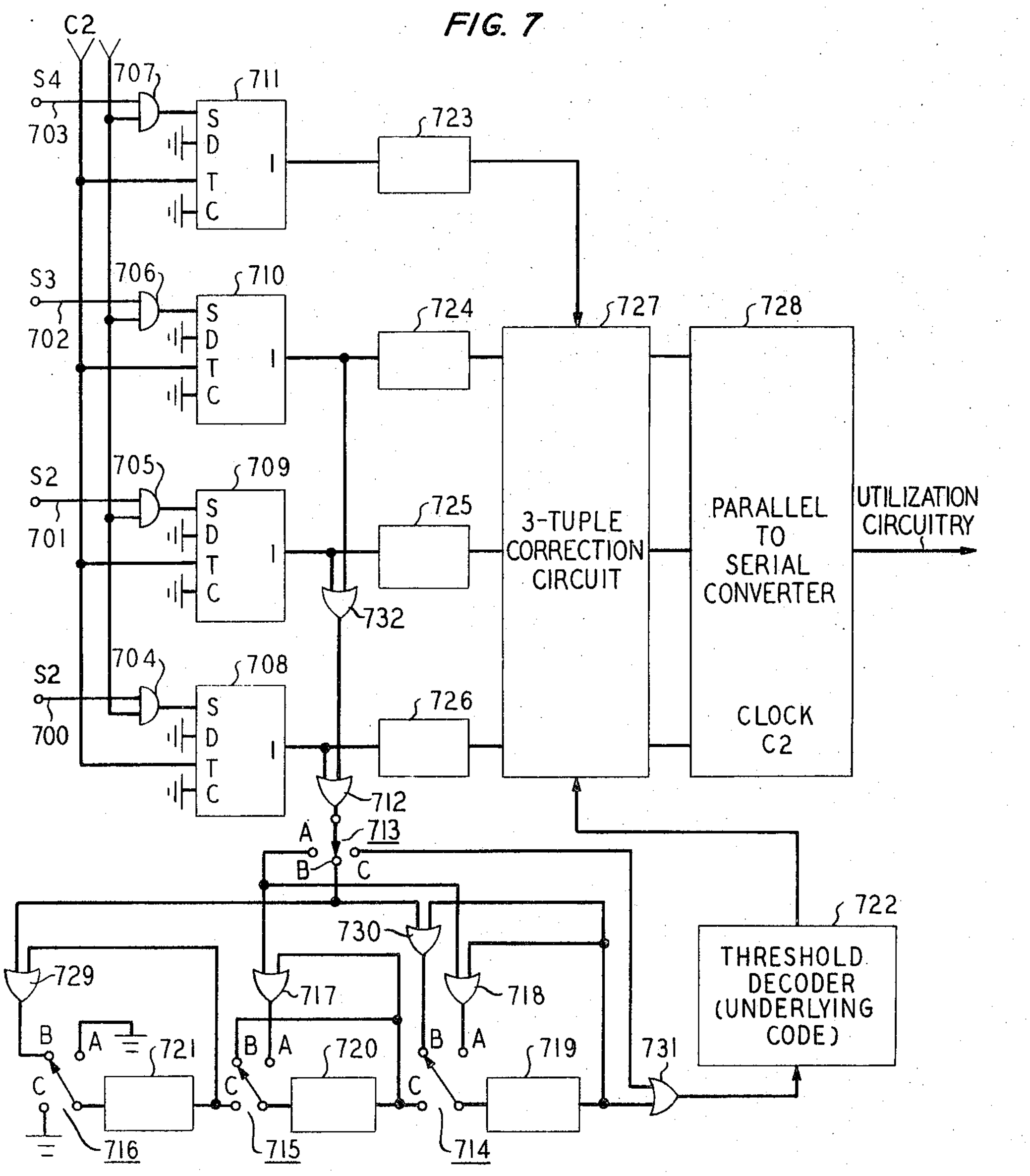
FIG. 7 shows a decoder for decoding the source bit sequence shown in FIG. 3.

Consider now the decoder of FIG. 7 for decoding signals encoded by the encoder of FIG. 5. The signals received from the channel will be, as discussed above, multilevel signals, and in the example under consideration there will be $2^3$ or eight signal levels. Each received level is used to generate in standard fashion the corresponding 3-tuple of binary signals which are then applied in parallel to the decoder of FIG. 7. Specifically, the first, second and third bits of the 3-tuple are applied to input leads 700, 701 and 702, respectively.

The three signals of the 3-tuple are ANDed with the SR clock signal shown on FIG. 6 by means of AND gates 704, 705 and 706. Incidentally, the timing waveforms of FIG. 6 control the operation of the circuit of FIG. 7, as well as that of FIG. 5. The output signals from AND gates 704–706 are applied to the set inputs S of registers 708, 709 and 710. In addition, a polarity-indicating signal is also generated for each received level indicating that the received signal was either below or above the nominal received signal as discussed above. The polarity indicating signal is applied to lead 703.

The Gray code for the first received level, that is, 3-tuple 001 in FIG. 3, is applied in parallel to registers 708–710 via leads 700–702 and gates 704–706. The output signals from registers 708–710 are added by mod 2 adders 732 and 712. During the application of this first three 3-tuple, switches 713, 714, 715 and 716 are in position A. Hence, the sum of the three bits of the first 3-tuple appearing at the output of adder 712 is applied to mod 2 adders 717 and 718. Adders 717 and 718 add this sum to the contents of registers 719 and 720 via the feedback connections and switches 714 and 715. Since registers 719 and 720 are initially clear, the sum, $i_1$, of the first three bits of the first 3-tuple is entered into registers 719 and 720. A 0 is entered into register 721.

During the application of the second 3-tuple, switches 713, 714, 715 and 716 are in position B. The sum, $i_2$, of the second 3-tuple is similarly formed and added to the contents of registers 719 and 721 via mod 2 adders 730 and 729. The registers 719–721 and 723–726 are all clocked by signals corresponding to waveform S in FIG. 6. The sum entered into register 719 is, of course, $p_3$. The sum entered into register 719 is $i_2$. The contents of register 720, $i_1$, is reentered in register 720. The sum of the bits of the third 3-tuple is formed when switches 713, 714, 715 and 716 are in position C. A 0 is entered into register 721. The contents of register 721, $i_2$, enters register 720. The contents of register 720, $i_1$, enters register 719. The contents of register 719, $p_3$, is added to the sum of the third 3-tuple in mod 2 adder 731. From FIG. 3, it is clear that the sum of the third 3-tuple is the sum of two source bits and $P_1$. Since $P_1$ generated at the transmitter is the sum of $p_3$ and the two source bits succeeding the first two 3-tuples of source bits, clearly, the addition of $p_3$ and the sum of the three bits of the third 3-tuple applied to the decoder must be zero if the first three levels were correctly received. The output from adder 731 is recognized as the syndrome signal of the underlying code C. Threshold decoder 722 uses the information specified by the syndrome signals to produce correction signals for the $i$-tuple sequence in accordance with the underlying code C. Threshold or majority logic decoders are well known in the art and the threshold decoder 727 is not considered a novel aspect of the present invention. Typical of such threshold decoders is that shown in the above-cited Lucky et al. text, p. 385 et seq. The correction signal, as described above, corresponds in this example, to the next level above or below the incorrectly received level. It remains, then, to specify which one the correct level is. This is accomplished by means of the polarity-indicating signal generated, as described above, elsewhere in the receiver and applied by means of lead 703, AND gate 707, register 711 and nine-stage shift register 723 to the 3-tuple correction circuit 727. By way of illustration, assume that the level 2 signal corresponding to the seventh 3-tuple ($i_7$) in FIG. 3 has been distorted during transmission and the signal received lies between the nominal received level 3 and the lower decision threshold for level 3. The receiver, then, decodes a level 3, generates the level 3 3-tuple, 110, and generates a signal signifying the polarity of the received signal to be below the nominal received level 3. The nine-stage shift registers 724–726 delay the decoder 3-tuple sufficiently to permit $p_{12}$, the last check signal which checks $i_7$, to be decoded and for threshold decoder 722 to produce a correction signal for $i_7$. Threshold decoder 722, then applies the correction signal for $i_7$ to correction circuit 727. The 3-tuple applied to it in parallel from delay registers 724–726 is incorrect (110). At the same time, the polarity-indicating signal, also suitably delayed in register 723, signals that the correct 3-tuple corresponds to the level below the received level (110). The correct 3-tuple, 111, corresponding to level 2 is then generated. Lastly, the parallel-to-serial converter converts the parallel arrangement of 3-tuples into serial form for application to utilization circuitry.

For purposes of completeness, FIG. 8 shows a typical 3-tuple correction circuit for use in the decoder of FIG. 7. The incorrect 3-tuple is shown on the input leads and the corrected 3-tuple appears on the output leads 805, 806 and 807. In addition, the polarity-indicating signal, 1, illustrated in FIG. 4 is applied to lead 804 and the correction signal 1, is applied via lead 817. The operation of the circuit is straightforward. For example, the 1 on lead 802 is ORed with the 0 on lead 803 by OR gate 809. The 1 on lead 810 is inverted by inverter 811 and the output, 0, ORed with the signal on lead 804, 1, by OR gate 812. The output 1, is applied to AND gate 813 along with the correction signal on lead 817, 1. The output 1 is added by mod 2 adder 814 with the signal applied via lead 803, 0. The resulting signal is a corrected version of the signal on lead 803. The remainder of the circuit operates in standard fashion and it is easily verified that the circuit effects correction of incorrect 3-tuples as indicated.

In order to ensure a complete understanding of the present invention, it is considered that an additional example is in order. FIG. 9 illustrates a source bit sequence for transmission via an 8-level transmission system. As in the preceding illustration, the source bits are enclosed to differentiate them from the check bits in the sequence. The signals corresponding to these source bits will be compressed in accordance with an $i = 2$ code. In addition, the underlying code is chosen to be a BCH (14,6) code. BCH codes are well-known block codes in the error-correcting arts. See, for example, the above-cited Peterson text.

Figure 11:
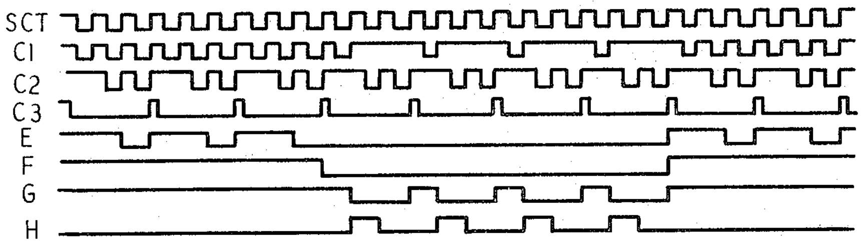
FIG. 11 illustrates the waveforms for controlling the operation of the encoder of FIG. 10.

As discussed in some detail above, the compression portion of the encoder of FIG. 10, mod 2 adder 1001, register 1003 and switch 1004 generate the information portion of the underlying code word as shown in the second row of FIG. 9. The timing waveforms for the encoder of FIG. 10 are shown in FIG. 11. For example, switch 1004 is in position E during the application of the first two source signals. Hence, these signals are summed by mod 2 adder 1001 and reapplied to register 1003. Then, during the application of the third bit of the first 3-tuple, switch 1004 is in position $\overline{E}$; hence, that signal is transmitted directly to register 1003. Note that register 1003 is cleared after the application of each 3-tuple of source bits. Switch 1005, in turn, applies the 2-tuples of the underlying code word to BCH encoder 1006 which generates the check bits, labeled as such in the second row of FIG. 3. The remaining elements, switches 1002, 1007 and mod 2 adder 1008 complete the encoding and interspersing to achieve the binary 3-tuple sequence of the top row of FIG. 9.

Figure 13:
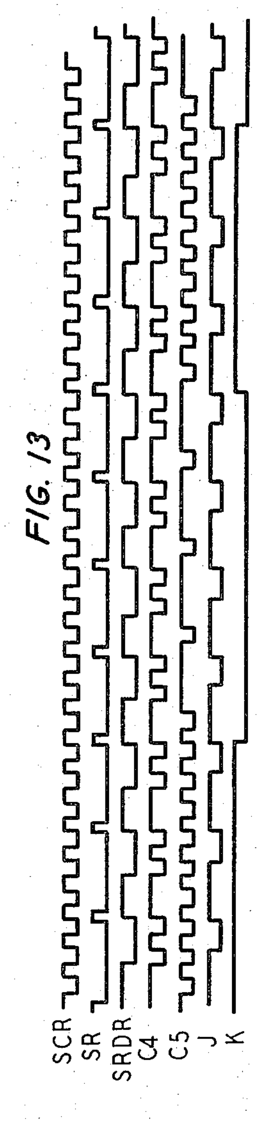
FIG. 13 shows the waveforms for controlling the decoder of FIG. 12.
Figure 12:
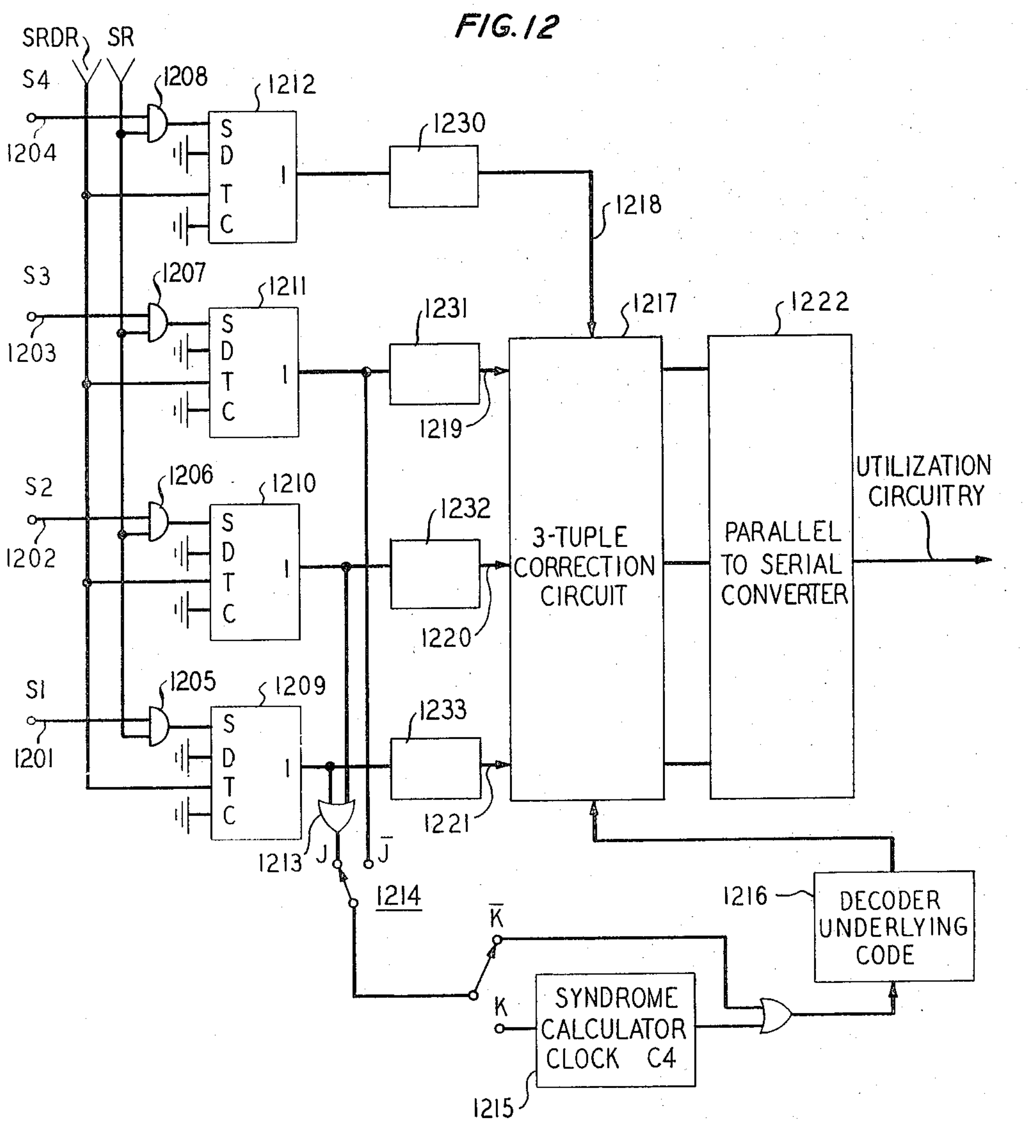
FIG. 12 illustrates the decoder for decoding the signals encoded of the circuit of FIG. 10.

The decoder for decoding signals encoded by the encoder of FIG. 10 is illustrated in FIG. 12. The timing waveforms for the decoder of FIG. 12 are shown in FIG. 13. Like the decoder of FIG. 7, the received levels are used to derive a 3-tuple and a polarity-indicating signal which are applied in parallel to leads 1201, 1202, 1203 and 1204. AND gates 1205, 1206, 1207 and 1208 and registers 1209, 1210, polarity-indicating 1211 and 1212 operate in standard fashion. As a result, mod 2 adder 1213 adds the first two bits of the 3-tuple and switch 1214 concatenates the output of adder 1213 and the third bit of the 3-tuple. The syndrome calculator 1215 and decoder 1216 detect and generate error-correction signals for the underlying code word in accordance with BCH decoding techniques. The error correction signals of the underlying code word bits are then applied to 3-tuple correction circuit 1217. The underlying code word together with the polarity-indicting signal on 1218 are used to correct the 3-tuple in correction circuit 1217 via leads 1219, 1220, 1221. Each of the registers 1230–1233 is clocked according to the waveform SRDR in FIG. 13. Lastly, serial-to-parallel converter 1222 converts the parallel arrangement of 3-tuples into a serial arrangement for transmission-to-utilization circuitry.

Although the present invention has been described in terms of a preferred embodiment, it will be apparent to those skilled in the art that various other arrangements can be derived without departing from the spirit and scope of the present invention. For example, the circuits and arrangements described above can be readily modified to be applicable to any $2^l$-level or phase system as well as the eight-level arrangements described above. Similarly, various error-correcting binary codes can be used as the underlying codes in the arrangements of the present invention. For example, conventional random-error correcting or burst-error correcting codes of either block or convolutional form can be used. Also the codes can be interleaved in standard fashion. Similar other modifications and variations will occur to those skilled in the art.

What is claimed is:

1. Apparatus for generating a sequence of transmission signals each having a unique one of $2^l$ values, corresponding to an input sequence of binary signals comprising first means for forming an ordered plurality of subsets of said input sequence, each of said subsets comprising an ordered binary l-tuple, second means for generating for each of said l-tuples a respective binary i-tuple where $1 \leq i \leq l$, third means for generating in accordance with a prescribed code, $C(n,k)$, where $n$ and $k$ are divisible without remainder by $i$, an $(n-k)$-tuple representing check bits for each set of $k/i$ consecutive binary i-tuples, and fourth means for combining each of $(n-k)/i$ i-tuples selected from each of said $(n-k)$-tuple with $(l-i)$ of said binary input signals, thereby to form respective composite l-tuples, and fifth means responsive to said l-tuples representing said subsets of said input signals and said composite l-tuples for selecting respective ones of said $2^l$ transmission signals.

2. Apparatus according to claim 1 wherein said first means comprises means for forming $k/i$ l-tuples.

3. Apparatus according to claim 2 wherein said second means comprises means for forming the mod 2 sum of the leftmost $(l-i+1)$ bits of the respective l-tuple, and means for combining said mod 2 sum with the rightmost $(i-1)$ bits of said respective l-tuple to form said i-tuple.

4. Apparatus according to claim 3 wherein said fourth means comprises means for forming the mod 2 sum of said $(l-i)$ of said binary input signals and the first bit of said associated $i$-tuple, and means for forming said composite l-tuple by 1. selecting the leftmost $(l-i)$ bits to be identical to said $(l-i)$ input binary signals,
2. selecting the $(l-i+1)$ th bit to be equal to said mod 2 sum of said $l-i$ input signals, and
3. selecting the rightmost $(i-1)$ bits to be identical to the rightmost $(i-1)$ bits of said associated $i$-tuple.

5. Apparatus for generating a sequence of binary signals corresponding to a received sequence of transmission signals, each of said transmission signals having one of $2^l$ values, l being a positive integer, comprising first means for generating a binary $i$-tuple for each transmission signal received, second means for generating a binary $n$-tuple corresponding to $n/i$ consecutive ones of said $i$-tuples, where $1 \leq i \leq l$, third means for interpreting said $n$-tuple as a received word of $(n,k)$ code, $C(n,k)$, and for correcting any errors so indicated by said $n$-tuple, fourth means for interpreting said corrected $n$-tuple as $n/i$ corrected $i$-tuples, fifth means for interpreting said corrected $i$-tuples as Gray code representations of said sequence of binary signals.

6. Apparatus according to claim 5 wherein said first means comprises 1. means for generating an l-bit Gray code representation of each of said received signals,
2. means for generating the mod 2 sum of the first $(l-i+1)$ bits of said Gray code and for designating this as the first bit of the desired $i$-tuple, and
3. means for selecting the last $(i-1)$ bits of said Gray code l-tuple as the last $(i-1)$ bits of said desired $i$-tuple.

* * * * *